(No Model.)
A. C. HAFELY.
CLASP FOR BOOKS.
No. 317,122. Patented May 5, 1885.
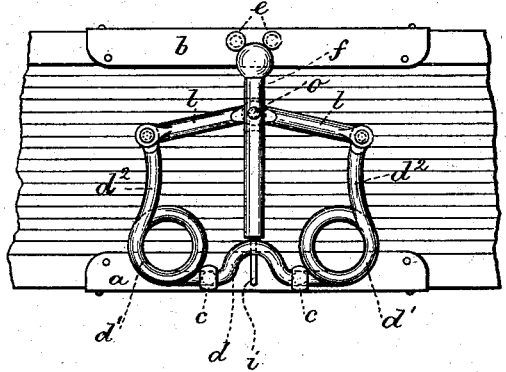
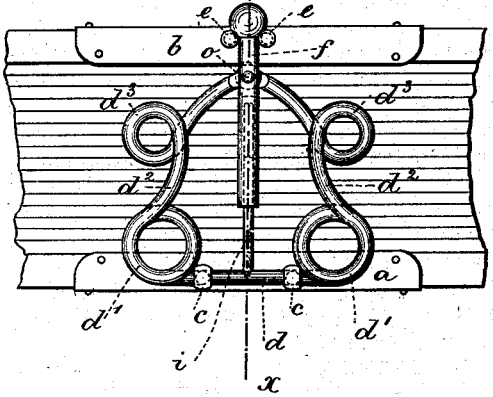
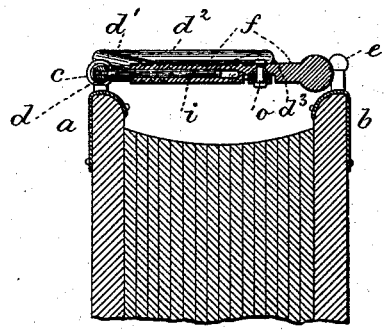
Witnesses:
J. Staib
Chos H. Smith
Inventor:
Alfred C. Hafely
per Lemuel W. Serrell
atty

UNITED STATES PATENT OFFICE.

ALFRED C. HAFELY, OF NEW YORK, N. Y.

CLASP FOR BOOKS.

SPECIFICATION forming part of Letters Patent No. 317,122, dated May 5, 1885.

Application filed August 25, 1884. (No model.)

*To all whom it may concern:*

Be it known that I, ALFRED C. HAFELY, of the city and State of New York, have invented an Improvement in Clasps for Books, of which the following is a specification.

Book-clasps have been made with a box hinged to one book-cover, and containing one or two springs, and a loop or frame to be passed over a stud upon the other book-cover, so as to draw the said covers together.

My invention relates to this general character of clasp; and it consists in the combination, with a sliding bar or loop, of wire springs bent to form the support for the loop or bar, and to give motion, by a toggle action, to the same in drawing the covers together, or to liberate the clasp for opening the book when the springs are pressed upon.

In the drawings, Figure 1 is an elevation of the said clasp. Fig. 2 is a modification in the shape of the springs, and Fig. 3 is a section at the line $x\ x$.

The plates $a$ and $b$ are adapted to be riveted upon or otherwise attached to the book-covers. The plate $a$ is provided with the hinge piece or pieces $c\ c$, and the spring-wire $d$ is united to these, preferably by passing through them.

The link or loop $f$ is adapted to catch upon the clip-plate $b$. If the clip-plate $b$ has two studs, $e$, upon it, as shown, then the link $f$ will have a head to pass between them; but if the plate $b$ has only one stud, then the part $f$ will have a hole through it or be formed as a loop to catch over the said stud.

The link or loop $f$ is guided at its back end by a stud or wire, $i$. If this wire $i$ is upon the loop $f$, then the same will pass through a hole in the spring $d$, as seen in Fig. 1; but if the wire $i$ is upon the spring $d$, as seen in Figs. 2 and 3, then the loop $f$ will be tubular or hollow to receive the same. The spring $d$ is coiled at $d'$ to increase the length and obtain greater flexibility by the length of wire, and the portions $d^2$ of the wire are adapted to be grasped between the thumb and fingers, and the ends of the spring are connected to the link or loop $f$ at the pivot $o$, so that when the portions $d^2$ of the spring are pressed upon the link or loop $f$ will be moved endwise by a toggle action to separate the same from the stud or studs $e$.

In Fig. 2 I have shown the wire $d$ as bent into loops $d^3$, to increase its length and render it sufficiently flexible. In Fig. 1 there are pivoted links $l$ intervening between the ends of the spring and the joint or pivot $o$. The natural expansion of the spring outwardly at the parts $d^2$ will tend to draw down the link or loop $f$ and close the book-clasp. The reverse action takes place when the clasp is pressed upon at its sides.

It will be apparent that the loop or link $f$, Fig. 2, may be omitted, the ends of the spring itself being connected to each other, and catching over the stud $e$.

I claim as my invention—

1. The combination, with the clip-plates $a$ $b$ and stud $e$, of a loop or link, $f$, and the toggle-acting spring $d$, forming the support for the loop or link, and the connection $c$ between the spring and the clip-plate $a$, substantially as set forth.

2. The combination, with the clip-plates $a$ $b$, of the hinge-connections $c$, the toggle-acting wire spring $d$, passing through the connections $c$, and coiled, as at $d'$, and the loop or link $f$, connected to and supported by the spring $d$, substantially as set forth.

3. The combination, with the clip-plates $a$ $b$, studs $e$, and hinge-pieces $c\ c$, of the toggle-acting wire spring passing through said hinge-pieces, the loop or link $f$, connected with the ends of the spring, and the guide-wire $i$, substantially as set forth.

4. The combination, in a book-clasp, of clip-plates, a stud on one of the clip-plates, hinge-pieces on the other clip-plate, and a toggle-acting wire spring connected with the hinge-pieces, and adapted to be grasped and pressed upon at its sides, to extend the toggle-acting wire spring in fastening or unfastening the clasp, substantially as set forth.

Signed by me this 23d day of August, A. D. 1884.

ALFRED C. HAFELY.

Witnesses:
  GEO. T. PINCKNEY,
  WILLIAM G. MOTT.